United States Patent
Uchiyama (10) Patent No.: US 7,580,071 B2
(45) Date of Patent: Aug. 25, 2009

(54) ELECTRONIC CAMERA AND CONTROL PROGRAM OF SAME FOR DETECTING FOREIGN MATERIALS

(75) Inventor: Takayuki Uchiyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 405 days.

(21) Appl. No.: 10/639,742

(22) Filed: Aug. 13, 2003

(65) Prior Publication Data

US 2004/0041936 A1  Mar. 4, 2004

(30) Foreign Application Priority Data

Aug. 30, 2002 (JP) .............................. 2002-253709
Jul. 2, 2003 (JP) .............................. 2003-190380

(51) Int. Cl.
  *H04N 9/64* (2006.01)
  *H04N 5/228* (2006.01)
(52) U.S. Cl. .............. 348/251; 348/208.11; 348/208.12
(58) Field of Classification Search ............ 348/207.99, 348/208.1, 208.2–208.8, 208.11–208.14, 348/211.9, 240.99, 240.1, 240.2, 240.3, 251, 348/252, 264, 267, 294, 295, 296, 302, 332–333.12, 348/335, 336, 340, 341, 344, 345, 346, 347, 348/360, 361, 363, 369, 375; 396/118
See application file for complete search history.

(56) References Cited

U.S. PATENT DOCUMENTS

| 5,635,983 | A | * | 6/1997 | Ohmori ................... 348/231.6 |
| 6,005,974 | A | * | 12/1999 | Kochi et al. ................ 382/190 |
| 7,106,371 | B1 | * | 9/2006 | Kubo et al. ................. 348/246 |
| 2001/0022619 | A1 | * | 9/2001 | Nishiwaki .................. 348/208 |
| 2001/0035910 | A1 | * | 11/2001 | Yukawa et al. .............. 348/349 |
| 2002/0093577 | A1 | | 7/2002 | Kitawaki et al. |
| 2003/0174902 | A1 | * | 9/2003 | Barkan ..................... 382/274 |
| 2004/0201707 | A1 | * | 10/2004 | Noguchi et al. .......... 348/208.7 |
| 2004/0207738 | A1 | * | 10/2004 | Wacker .................... 348/294 |

FOREIGN PATENT DOCUMENTS

| JP | A 5-68209 | 3/1993 |
| JP | A-11-183323 | 7/1999 |
| JP | A-2000-312314 | 11/2000 |
| JP | A-2001-86411 | 3/2001 |
| JP | A 2002-209147 | 7/2002 |

* cited by examiner

*Primary Examiner*—M. Lee
*Assistant Examiner*—Albert H Cutler
(74) *Attorney, Agent, or Firm*—Oliff & Berridge, PLC (57) ABSTRACT

The invention relates to an electronic camera having self-detection function of foreign materials and a control program thereof. The electronic camera includes: an image sensor having an image pickup plane on an image plane of an optical system; a formation changing section changing a state of image formation of the optical system on the image pickup plane; and a control section driving and controlling the image sensor and formation changing section. The control section drives the formation changing section to set a plurality of states of image formation different from each other, and it drives the image sensor to obtain a plurality of images in each of the states and compares the plurality of images to find a part of the image which has not varied with a change in the state of image formation, and determines the found part as image of a foreign material.

11 Claims, 10 Drawing Sheets

☑ Foreign Material Detection

☐ Motion Blur Correction

Next (b)

Store Not-corrected Image ○

Store Corrected Image ◎

ELECTRONIC CAMERA AND CONTROL PROGRAM OF SAME FOR DETECTING FOREIGN MATERIALS

CROSS REFERENCE TO RELATED APPLICATION

This application is based upon and claims the benefit of priority from the prior Japanese Patent Application No. 2002-253709, filed Aug. 30, 2002, and No. 2003-190380, filed Jul. 2, 2003, the entire contents of which are incorporated herein by reference.

BACKGROUND OF THE INVENTION

1. Field of the Invention

The present invention relates to an electronic camera and a control program thereof.

2. Description of the Related Art

Images obtained with an electronic camera may sometimes have punctiform shadows which occur due to minute flows on an optical device surface or foreign material such as foams or air bubbles formed inside the optical device. If the foreign material occurs at a place close to an image sensor such as an optical filter disposed on the image pickup plane of the imaging sensor, it has a great influence on an image, and the closer to the image sensor the place of occurrence, the greater the influence on an image.

The foreign material is mainly formed at the time of manufacture of the optical device, and it will not move with time (hereinafter to be referred to as unmoving foreign material). The foreign material of this kind is one of the factors which lead to degrading the performance of the electronic camera.

Generally, the electronic camera uses an optical device which is manufactured by a very advanced manufacturing technique to prevent the foreign material from occurring. However, even if the electronic camera adopts an optical device having the unmoving foreign material, it is able to find them at pre-shipping inspection. Accordingly, the manufacturers of the electronic camera should program the electronic camera in advance in such a manner that signals affected by the unmoving foreign material are automatically corrected so as not to affect generated images. Such programming is a general practice for an image sensor with defective pixels (disclosed in Japanese Unexamined Patent Application No. Hei 5-68209 and so on).

Further, there is another kind of foreign material aside from the above unmoving foreign material. It may possibly occur after shipping of the electronic camera and move over time (referred to as moving foreign material hereinafter). The moving foreign material is a fleck of dust or impurities entering into the camera and attaching to a surface of the optical device or floating in an imaging light path. They are likely to occur especially at exchanging the lens of the electronic camera of lens changeable type. At which place this moving foreign material will occur is unpredictable; therefore, it is not possible to program the electronic camera before the shipping to prevent the occurrence of the moving foreign material. The moving foreign material cannot be found until a user of the electronic camera obtains an image and displays it on the monitor. Consequently, the user needs to perform image correction by himself in order to suppress influence of the foreign material on the image. Specifically, the user has to check the image on the monitor, find out where the foreign material occurs, and designate every found material by use of a computer's graphic software or the like. Besides, the prevention of occurrence of the moving foreign material is very difficult unlike the unmoving foreign material.

In other words, the user has to frequently clean up the inside of the electronic camera with meticulous care and remove dust and impurities causing the moving foreign material. However, it is impossible to remove every fleck of dust despite of however carefully the user handles the camera. Also, there are certain places inside the electronic camera which the user cannot clean up because of the arrangement of the optical device.

SUMMARY OF THE INVENTION

In view of solving such problems, an object of the invention is to provide self-detection function of foreign materials and a control program thereof.

The electronic camera of the invention includes: an image sensor having an image pickup plane on an image plane of an optical system; a formation changing section changing a state of image formation of the optical system on the image pickup plane; and a control section driving and controlling the image sensor and the formation changing section. The control section drives the formation changing section to set a plurality of states of image formation different from each other and drives the image sensor to obtain a plurality of images in each of the states. It also compares the plurality of images to find a part of the image which has not varied in accordance with a change in the state of image formation, and determines the found part as image of a foreign material. Accordingly, both of the unmoving and moving foreign materials are detectable.

Preferably, the number of the plurality of images should be two because it makes it possible to detect a foreign material easily. Also preferably, the number should be three or more, which enables high foreign material detection accuracy.

More preferably, the plurality of images include at least an image as a criterion of the comparison and two images which are shifted from the image as a criterion in a same direction. Also, the plurality of images include at least an image as a criterion of the comparison and two images which are shifted from the image as a criterion in opposite directions to each other. Accordingly, it is possible to detect foreign material at any place on the image.

More preferably, a diameter of an aperture diaphragm of the optical system should be scalable. The control section sets the diameter of the aperture diaphragm to a minimum value when obtaining the plurality of images. Accordingly, it is possible to heighten the foreign material detection accuracy.

More preferably, the control section performs a series of operations from the driving of the formation changing section to the driving of image sensor immediately after performing a normal shooting in which the image sensor is driven according to an instruction from exterior. Then, it detects a foreign material by comparing an obtained image by the normal shooting with obtained images by the series of operations. This improves operability of the electronic camera.

More preferably, the optical system has a mechanism for transferring, on the image pickup plane, an image forming position at which an image is formed. The formation changing section changes a state of the image formation by driving the mechanism. Accordingly, a known motion blur correction mechanism is adaptable.

More preferably, the control section should be settable to a blur correction mode in which the transferring mechanism is driven in response to vibration and to a foreign material detection mode in which a foreign material is detected, in accordance with an instruction from an exterior. While being in the blur correction mode and foreign material detection mode at the same time, the control section sets a size of an area in which the image forming position is transferred to a smaller value than while being in only the blur correction mode. This realizes high foreign material detection accuracy.

Preferably, the optical system has a mechanism for moving the image forming position to an optical axis direction, and the formation changing section changes the state of the image formed by driving the mechanism. Therefore, a known focus adjustment mechanism is adaptable.

More preferably, the optical system has a mechanism for changing an image size, and the formation changing section changes a state of the image formation by driving the mechanism. Therefore, a known image size alteration mechanism is adaptable.

The control program of the invention is for an electronic camera including: an image sensor having an image pickup plane on an image plane of an optical system; a formation changing section changing a state of image formation of the optical system on the image pickup plane; and a control section driving and controlling the image sensor and the formation changing section. The program comprises the steps of: setting a plurality of states of image formation different from each other by driving the formation changing section, and driving the image sensor to obtain a plurality of images in each of the states; and comparing the plurality of images to find a part of the image which has not varied in accordance with a change in the state of image formation and determining the found part as image of a foreign material. Accordingly, both of the moving and unmoving foreign materials are detectable.

BRIEF DESCRIPTION OF THE DRAWINGS

The nature, principle, and utility of the invention will become more apparent from the following detailed description when read in conjunction with the accompanying drawings in which parts are designated by identical reference numbers, in which.

DESCRIPTION OF THE PREFERRED EMBODIMENT

In the following embodiments of the present invention will be described with reference to the drawings.

First Embodiment

Figure 1:
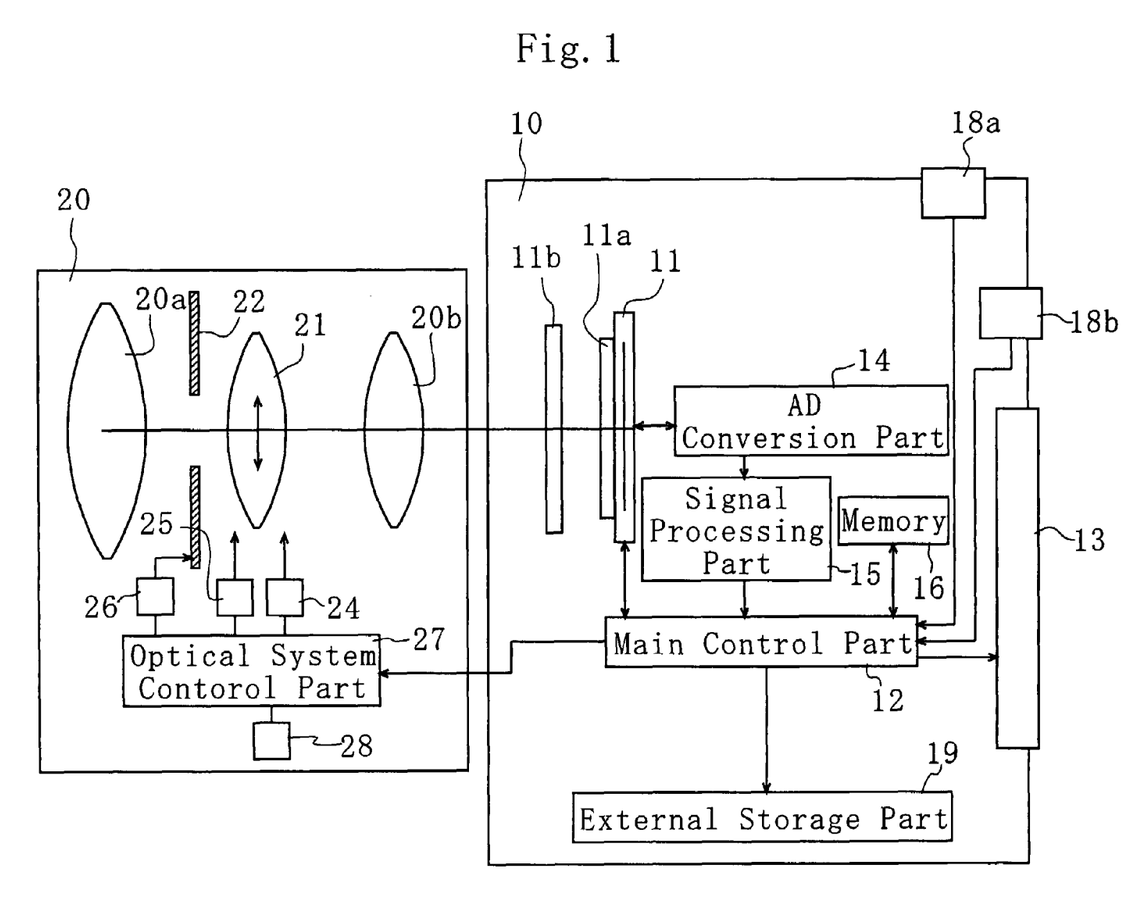
FIG. 1 shows a structure of an electronic camera according to first and second embodiments.

First, referring to FIGS. 1 to 4, a first embodiment of the invention will be described. FIG. 1 shows a structure of an electronic camera according to the first embodiment and a second embodiment (to be described later). Note that an electronic camera of lens-changeable type is discussed herein.

The electronic camera is composed of a changeable lens unit 20 and a camera body 10. The changeable lens unit 20 includes lenses 20a, 20b, and a motion blur correction lens 21, an aperture diaphragm 22, a positioning sensor 24, an optical system driving mechanism 25, a diaphragm driving mechanism 26, a vibration sensor 28, and an optical system control part 27.

A light beam reflected from a subject passes through the lenses 20a, 20b and motion blur correction lens 21, and the lenses form an image on an image pickup plane of an image sensor 11 in the camera body 10. The optical system driving mechanism 25 is composed of a gear and a motor and transfers the motion blur correction lens 21 (in directions indicated by arrows in the drawing, for example) to move an image forming position on the image pickup plane of the image sensor 11. The positioning sensor 24 senses a positioning of the motion blur correction lens 21. The diaphragm driving mechanism 26 comprises a gear and a motor, and scales the diameter of the aperture diaphragm 22. The vibration sensor 28 comprises an acceleration sensor, and senses vibration of the changeable lens unit 20. The optical system control part 27 comprises a microprocessor and others, and controls each part of the changeable lens unit 20 according to an instruction from the main control part 12 in the camera body 10 to perform motion blur correction and more.

The motion blur correction is done as follows.

Upon receiving from the main control part 12 an instruction to start the motion blur correction, the optical system control part 27 calculates a transfer amount of the motion blur correction lens 21 which corresponds to an amount necessary for eliminating a vibration vector (direction and amount) indicated by an output of the vibration sensor 28. Referring to an output of the positioning sensor 24, the optical system control part 27 instructs the optical system driving mechanism 25 to move the motion blur correction lens 21 by the transfer amount. Thus the motion blur correction is made, thereby projecting a certain imaging area without blur on the image pickup plane of the image sensor 11.

Further, the camera body includes an image sensor 11, an AD conversion part 14, a signal processing part 15, a buffer memory 16, a display part 13 (LCD and the like, a release button 18a, an operation button 18b, an external storage part 19 (portable memory and its reader), a main control part 12, and so on.

The image sensor images an image of a subject formed on the image pickup plane. Seen from the image sensor 11, disposed on the front surface of the image sensor 11 are a cover glass 11a, an optical filter 11b, and so on. Dust or impurities on or adjacent to the cover glass 11a and the optical filter 11b are moving foreign materials. Foams or air bubbles formed at manufacturing both of the cover glass 11a and the optical filter 11b are unmoving foreign materials.

The AD conversion part 14 and signal processing part 15 process signals output from the image sensor 11. The processed signals are held in the buffer memory 16 and stored in the external storage part 19 when necessary. The display part 13 displays images generated from image data which is output from the image sensor 11 or necessary information for users' manipulation to the release button 18a or operation button 18b. The main control part 12 comprises a microprocessor, and controls, in accordance with users' manipulation to the release button 18a or operation button 18b, each part of the camera body 10 to shoot a subject, or controls the optical system control part 27 in the changeable lens unit 20 to start/terminate the above motion blur correction.

Image shooting is performed as follows.

Upon being given a user's instruction to shoot (i.e., when the release button 18*a* fully pressed), the main control part 12 drives the image sensor 11, and allows signals output from the image sensor 11 to be held in the buffer memory 16 via the AD conversion part 14 and signal processing part 15.

Next, the characteristic operation of the electronic camera according to the first embodiment will be described in detail.

Figure 2:
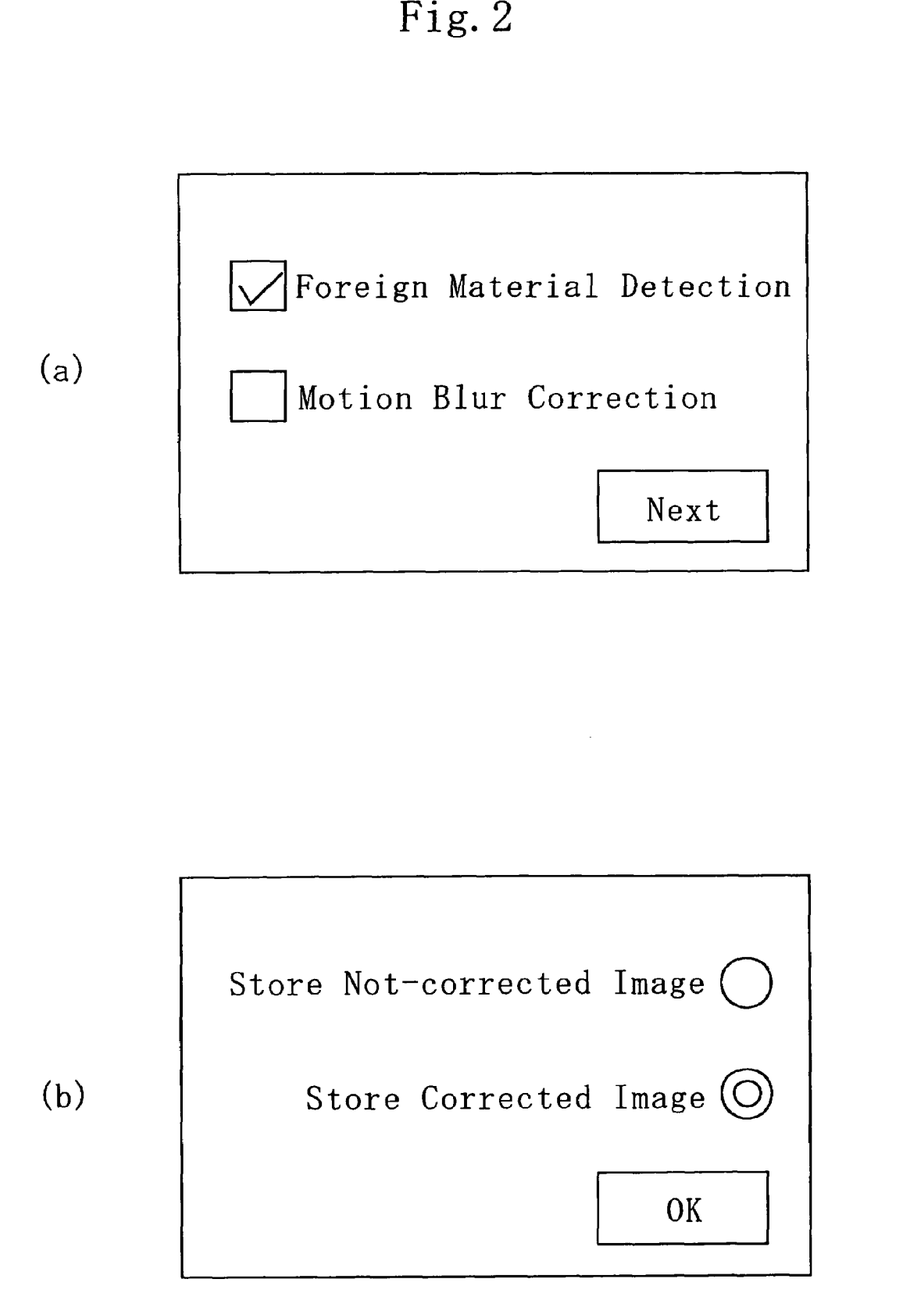
FIG. 2 shows an example of screen display.

The display part 13 displays operational settings on the screen as shown in FIGS. 2 (*a*), (*b*), in accordance with a user's manipulation to the release button 18*a* and the operation button 18*b*. With the operational settings shown in FIG. 2(*a*) on the screen, the user sets/cancels the foreign material detection mode and motion blur correction mode to/from the camera body 10 by manipulating the release button 18*a* and operation button 18*b*. When identifying, from the operations of the release button 18*a* and operation button 18*b*, the setting the user has selected, the main control part 12 stores the setting in a predetermined area of the memory thereof.

If the user sets the foreign material detection mode, the display part 13 displays operational settings shown in FIG. 2(*b*) on the screen. The user can select one of the operational settings of FIG. 2(*b*), "store not-corrected image" and "store corrected image" by manipulating the release button 18*a* and operation button 18*b*. When identifying, from the operations of the release button 18*a* and operation button 18*b*, the setting the user has selected, the main control part 12 stores the setting in a predetermined area of the memory thereof.

Figure 3:
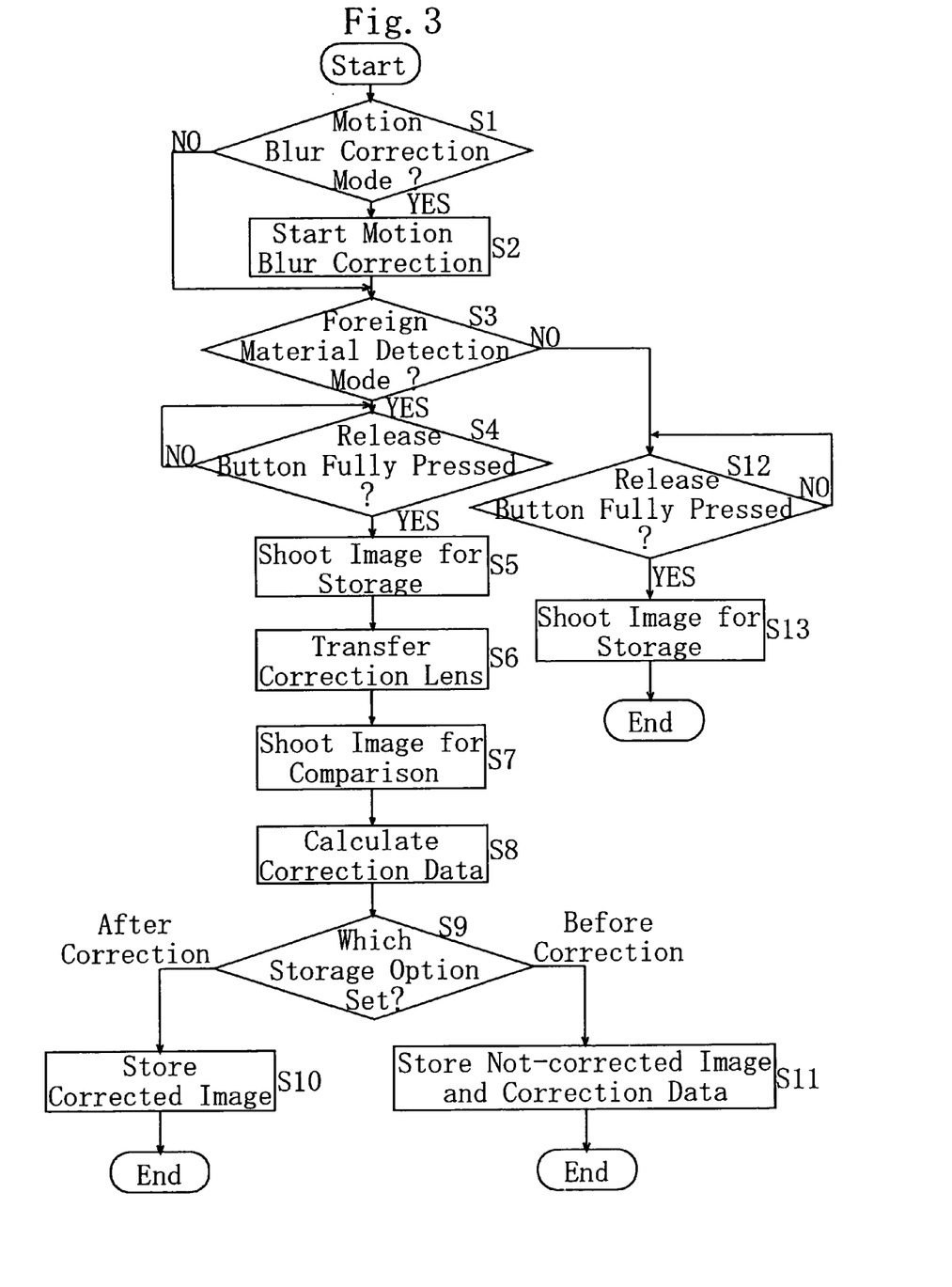
FIG. 3 is an operational flowchart of the main control part 12 according to the first embodiment.

FIG. 3 is an operational flowchart of the main control part 12 according to the first embodiment. Note that this operational flowchart starts every time the release button 18*a* is pressed halfway.

When the operational flowchart starts, the main control part 12 determines whether or not the motion blur correction mode is set, referring to the memory (Step S1). If yes, the main control part 12 instructs the optical system control part 27 to start the motion blur correction (Step S2). The main control part 12 also determines whether or not the foreign material detection mode is set (Step S3). If yes (Step S3 YES), it proceeds to Step S4 to perform normal shooting and foreign material detection, and if no (Step S3 NO), it proceeds to Step S12 to perform only the normal shooting.

At Step S4, the main control part 12 determines whether or not the release button 18*a* is fully pressed. When determining yes (Step S4 YES), it performs shooting (Step S5). In case where the motion blur correction is being performed, the main control part 12 gives an instruction, at the time the shooting is completed, to the optical system control part 27, to complete the motion blur correction. Hereinafter, images obtained at the time the release button is fully pressed will be referred to "image for storage" (see FIG. 4(*a*1)).

Figure 4:
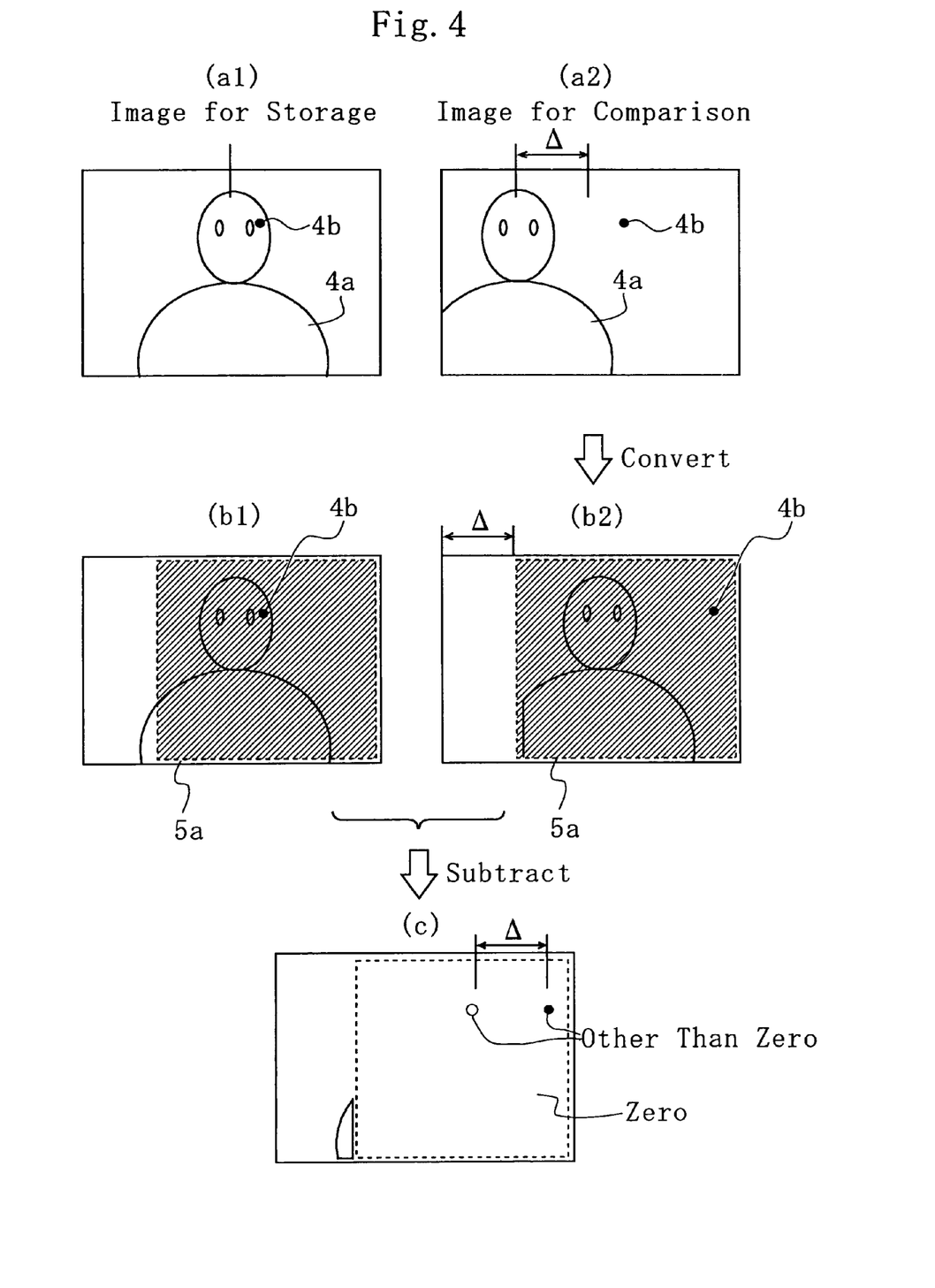
FIG. 4 explains a method of detecting foreign materials according to the first embodiment.

Upon obtaining an image for storage, the main control part 12 immediately instructs the optical system control part 27 to transfer the motion blur correction lens 21 (Step S6). The optical system control part 27 gives an instruction to the optical system driving mechanism 25 to transfer the motion blur correction lens 21, referring to an output of the positioning sensor 24. At this point, as shown in FIG. 4(*a*2), an image forming position on the image pickup plane of the image sensor 11 (the position of a subject image 4*a* formed on the image pickup plane) moves by a predetermined amount. Hereinafter, the predetermined amount is assumed to be "Δ". (Note that the predetermined amount is set in a horizontal direction; however the image forming position may be transferred in a vertical direction.)

The main control part 12 calculates a transfer amount of the motion blur correction lens 21, which is an amount needed for transferring the image forming position by the predetermined amount, based on criterion shooting information including a diaphragm number of the aperture diaphragm 22, a focal distance of the changeable lens unit 20, and a shooting distance. Confirming that the image forming position has been transferred by the amount "Δ", the main control part 12 immediately shoots an image (Step S7). Hereinafter, an automatically obtained image subsequent to an image for storage will be referred to "image for comparison" (see FIG. 4(*a*2)).

In addition, to obtain the image for storage and the image for comparison (Steps S5, S7) during the foreign material detection mode (Step S3 YES side), the main control part 12 may instruct the optical system control part 27 to set the diameter of the aperture diaphragm 22 to a minimum number. The optical system control part 27 allows the diaphragm driving mechanism 26 to make the diameter setting. The reason for setting the diameter at a minimum number is because increasing the field depth of the electronic camera results in clearly imaging a foreign material, thereby increasing the detection accuracy.

Next, the main control part 12 compares data of the image for storage with data of the image for comparison to detect a foreign material, and calculates correction data in accordance with the detected foreign material (Step S8). As shown in FIGS. 4 (*a*1), (*a*2), the image of a subject 4*a* in the image for comparison has shifted by "Δ" from that in the image for storage. On the other hand, the images of a foreign material 4*b* have not shifted from each other at all between the images for storage and for comparison.

At Step S8 the main control part 12 converts one of the image for storage and the image for comparison (here, the image for comparison) for easier comparison (FIGS. 4(*b*1), (*b*2)). The entire image for comparison is converted such that the position of the subject image 4*a* therein coincides with that of the image for storage. However, in comparing the image for storage and the image for comparison, the subject images 4*a* not only shift from each other by "Δ" but also distort a little. Therefore, the above conversion contains a computation for correcting the distortion. The details of the computation may be determined in accordance with the transfer pattern of the motion blur correction lens 21 in Step 6 or it may be determined in the following way.

Image identifying processing is performed on both of the image for storage and image for comparison, thereby identifying common parts of both of the images (=subject image 4*a*). Then, the common parts are compared to obtain a shifting amount and distortion amount, and the details of the computation are determined in accordance with the shift and distortion amounts.

As shown in FIG. 4(*c*), when obtaining differences between data of the converted image for storage and image for comparison, a difference between the common parts 4*a* (subject image) is zero, but a difference between the images of the foreign material 4*b* is not zero, and it will be a value depending on a concentration of the images of the foreign material. Accordingly, the main control part 12 obtains a difference between data of the converted images for storage and for comparison and determines that a foreign material does not exist in an area with the difference zero, and that a foreign material does exist in an area with the difference not zero.

The main control part 12 identifies, among the data of the image for storage, a pixel address (size and position of the image of the foreign material 4*b*) and a pixel value (concentration of the image of the foreign material 4*b*). For the purpose of suppressing the foreign material from affecting the image for storage the main control part decides the details of correction (to be referred to correction data) to be made on the image for storage, based on the identified pixel address and pixel value.

Here, the correction should be done by interpolation operation, with reference to the pixel values of periphery of the foreign material 4b. Therefore, the correction data becomes a parameter for determining the details of the interpolation operation. For instance, the correction data can be three parameters for pixel addresses of the center of the foreign material 4b, for pixel addresses of the peripheral pixels to be referred to, and for each coefficient to be multiplied with the pixel values of the referred peripheral pixel addresses.

Upon the determination of the correction data, the main control part 12, referring to the memory, determines which one of storing options, "store corrected image" and "store not-corrected image", has been set (Step S9). If the former has been set (Step S9 YES), the main control part 12 proceeds to Step S10, corrects (performs interpolation operation) the data of the image for storage in conformity with the correction data, and writes the corrected data to the external storage part 19 or the like. If the latter has been set (Step S9 NO), the main control part 12 proceeds to Step S11, and does not make the correction but writes the data of the image for storage and the correction data in association with each other into the external storage part 19 or the like. Note that in case where the foreign material detection mode is not set (Step S3 NO side), none of the Steps S6 to S11 (foreign material detection) will be performed but only the image for storage will be obtained (Step S13) in response to the release button 18a's fully pressed (Step S12 YES).

As described above, the electronic camera of the first embodiment compares two images (image for storage and image for comparison) obtained by changing the image forming position on the image pickup plane, and determines as a foreign material a part of the images with no change appearing. Accordingly, it is possible to detect with sureness both of the unmoving foreign material with no possibility of moving and the moving foreign material moving over time.

Moreover, since this electronic camera is automatically obtainable of images for comparison after the shooting at Step S5, the user can focus on photo taking without caring about the occurrence of foreign materials. It also effectively utilizes the mechanism for motion blur correction (the positioning sensor 24, optical system driving mechanism 25, optical system control part, vibration sensor 28) by using it also for foreign material detection.

Furthermore, the user is able to set/release the foreign material detection mode to/from the electronic camera, and selectively set one of the storing options of "store corrected image" and "store not-corrected image". While the "store not-corrected image" is set, the correction data in accordance with the type of a foreign material (size, position, and concentration of the image of a foreign material) can be obtained together with data of image for storage. In other words, the user can acquire necessary information for obtaining images with the influence of the foreign material suppressed. On the other hand, while the "store corrected image" is set, the data of image for storage is automatically and properly corrected in accordance with the type of a foreign material (size, position, and concentration of the image of a foreign material). Thus, the user can obtain information on images with the influence of the foreign material suppressed. Conclusively, the electronic camera of the first embodiment is capable of responding to users' various demands.

Note that relations between the first embodiment and the claims are as follows: the image sensor 11 corresponds to the image sensor; the optical system driving mechanism 25, the positioning sensor 24, and the optical system control part 27 correspond to the formation changing section; and the main control part 12 and optical system control part 27 correspond to the control section.

The first embodiment attends to the content (subject image 4a) of the images for storage and for comparison. That is, one of the images for storage and for comparison is converted so that the position of the subject image 4a thereof coincides with that of the other of the images for storage and for comparison. Thereafter, difference between the data of both of the images is obtained. However, the following method is also employable.

This method does not attend to the content (subject image 4a) of the images for storage and for comparison. Instead, the images for storage and for comparison are superimposed on each other as raw data output from the image sensor 11 to obtain difference between the data. In this case it should be determined that the image of the foreign material is not present in an area where the difference is other than zero, but it is present in an area where the difference is zero. In conclusion, any method will be employable as long as a part with changes occurring and a part with no change occurring are distinguishable, in comparing the images for storage and for comparison.

Second Embodiment

The second embodiment of the invention will be described with reference to FIGS. 1, 5, and 6. However, the description will be only on differences between the first and second embodiments. The electronic camera of the second embodiment is equivalent to the electronic camera of the first embodiment except for having a main control part 42 instead of the main control part 12.

Figure 5:
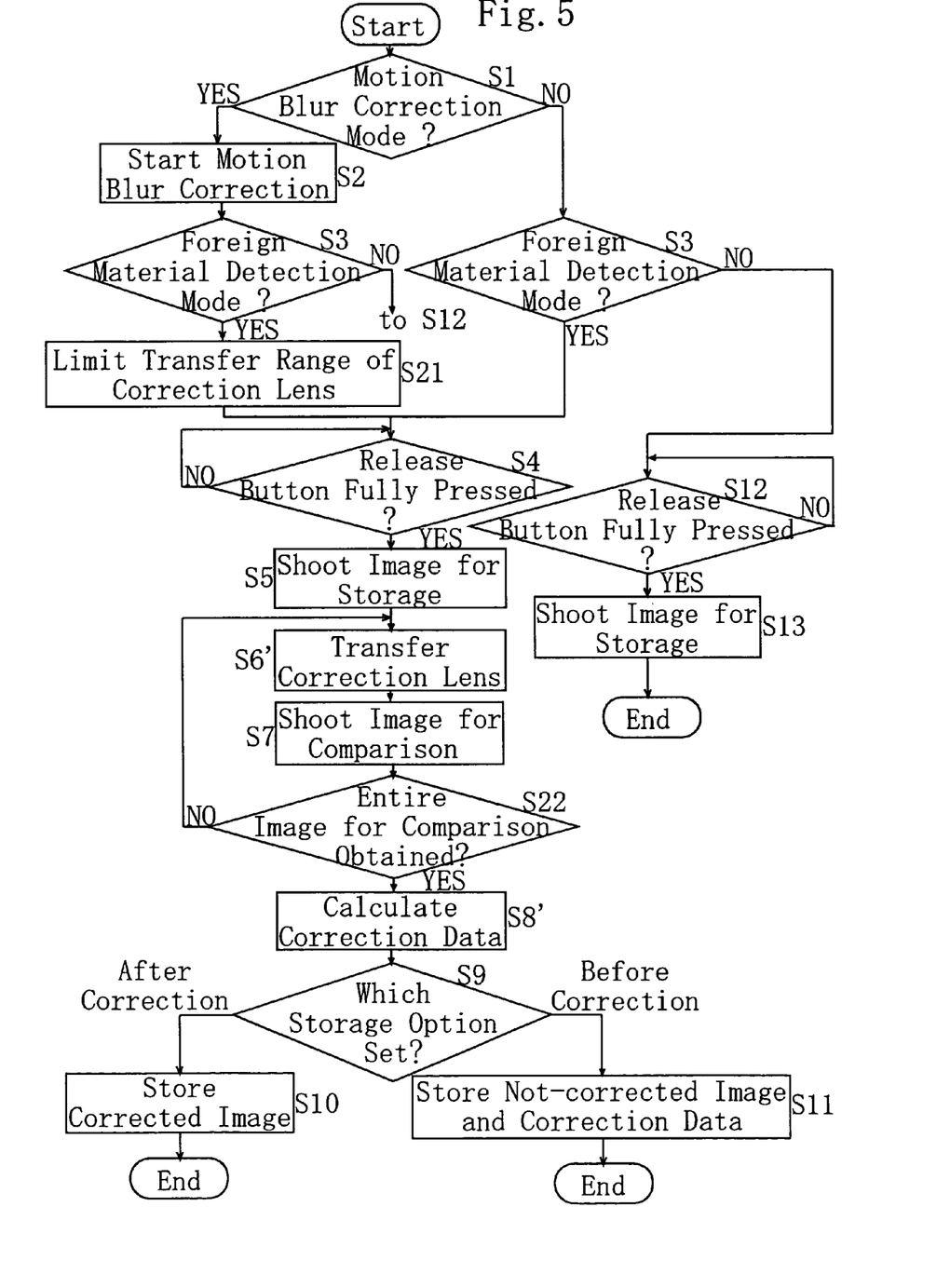
FIG. 5 shows an operational flowchart of the main control part 42 according to the second embodiment.

FIG. 5 is an operational flowchart of the main control part 42. Note that some of the steps shown in FIG. 5 are the same as those in steps shown in FIG. 3; therefore, they will be given the same numerals and the description thereon will be omitted here. Also, the operational flowchart of FIG. 5 starts every time the release button 18a is pressed halfway as that of FIG. 3.

First of all, in this embodiment two or more images for comparison are obtained as shown in Steps S7 and S22. The number of obtained images is increased in order to enhance the foreign material detection accuracy.

Specifically, recognizing that the release button 18a is fully pressed (Step S4 YES) during the foreign material detection mode (Step S3 YES), the main control part 42 moves the motion blur correction lens 21 (Step S6') and obtains an image for comparison (Step S7) a plurality of times. At Step S6' an amount by which the motion blur correction lens 21 transfers (i.e., how much image forming position transfers) differs every time. For example, when an image for comparison is obtained twice and the image forming position transfers by +Δ at the first time, it is preferable that it transfer by −Δ at the second time. (The transfer amount of the image forming position is determined from how much it differs from the image forming position as a criterion at the time of obtaining the image for storage (Step S5)).

In the following a case where the number of obtained images for comparison is two (i.e., three if including an image for storage) will be explained. It should be noted that this is the simplest and surest way of foreign material detection.

Figure 6:
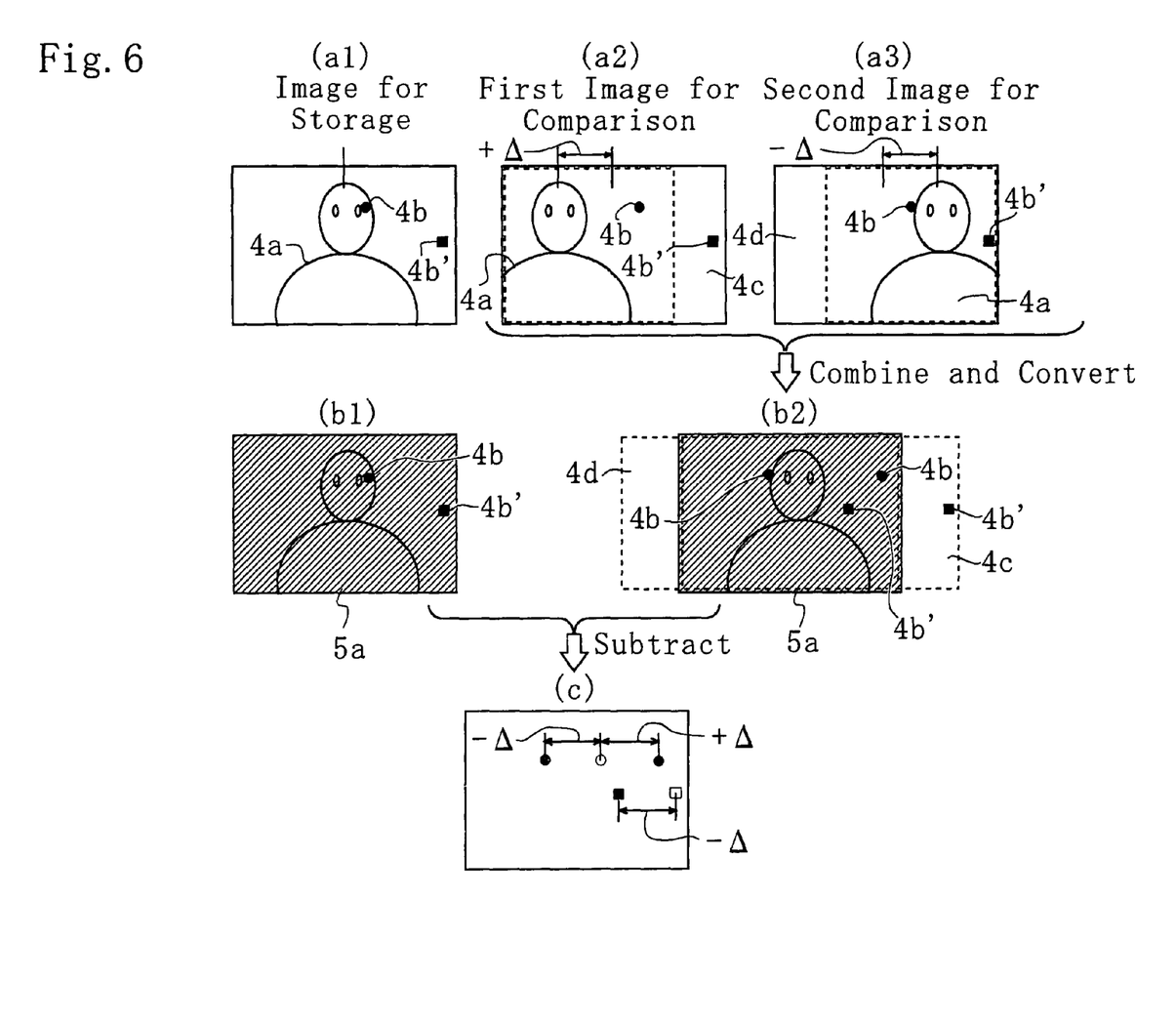
FIG. 6 explains a method of detecting foreign materials according to the second embodiment.

FIG. 6(a1) shows the image for storage, FIG. 6(a2) shows the image for comparison obtained when the image forming position moves by +Δ (to be referred to as the first image for comparison), and FIG. 6(a3) shows the image for comparison obtained when the image forming position moves by −Δ (to be referred to the second image for comparison). As shown in FIGS. 6(a1), (a2), the subject image 4a shifts by +Δ between the image for storage and the first image for comparison, however the images of the foreign material 4b, 4b' are at the same position therebetween because it does not move owing to the motion blur correction lens 21's transfer. Here, the image of the foreign material 4b is located at a position close to the center of the image for storage but it is located in the same area on the first image for comparison as the subject image 4a is present. Also, the image of the foreign material 4b' located in the periphery of the image for storage is present in an area 4c different from the area on the first image for comparison where the subject image 4a is present. Accordingly, just comparing the image for storage and the first image for comparison cannot achieve foreign material detection.

Further, referring to FIG. 6(a1), (a3), the common part 4a shifts by −Δ between the image for storage and the second image for comparison, however, the images of the foreign material 4b, 4b' are at the same position therebetween because it does not move owing to the motion blur correction lens 21's transfer. Here, both of the images of foreign material 4b, 4b' are located in the area on the second image for comparison where the subject image 4a is present.

At Step S8, the main control part 42 combines the first and second images for comparison (FIG. 6(b2)). On the combined image, the image of the foreign material 4b located around the center of the image for storage appears at positions shifting therefrom by +Δ, −Δ. However, the image of the foreign material 4b' located in the periphery of the image for storage appears not at a position shifting therefrom by +Δ but only at a position shifting therefrom by −Δ . Here, the main control part 42 obtains differences between data of image for storage (FIG. 6(b1)) and data of the combined image for comparison (FIG. 6(b2)). (FIG. 6(c)) The difference is other than zero at the position of the image of the foreign material 4b on the image for storage, at a position shifting by +Δ therefrom, at a position shifting by −Δ therefrom. Also, the difference is other than zero at the position of the image of the foreign material 4b' on the image for storage, at a position shifting by +Δ therefrom, at a position shifting by −Δ therefrom (see FIG. 6(c)).

For the area with the difference zero the main control part 42 determines that there is no foreign material therein, but for the area with the difference not zero it determines that there is a foreign material therein. Thereafter, correction data determining processing and image storing processing are performed as the processings of the first embodiment are done in FIG. 3, Steps S8-S11.

Meanwhile, in the first embodiment the determining of presence/absence of a foreign material is feasible only for the areas of the images for storage and comparison where the common part of the two images is present. That is, a to-be-evaluated area 5a of the first embodiment, which is shadowed with diagonal lines in FIGS. 4(b1), (b2), is a part of the image for storage. This allows the electronic camera of the first embodiment to detect a foreign material in a short time owing to the fewer number of the obtained images, however, there is a possibility of missing a presence of the foreign material in a case where it is imaged in the corner of the image pickup range.

On the contrary, the electronic camera of the second embodiment can enlarge the common part of both of the images for storage and for comparison by combining the two images for comparison which have the subject images thereon shifting in opposite directions from each other (see FIGS. 6(b1), (b2)). In the second embodiment as shown in FIGS. 6(b1), (b2), a to-be-evaluated area 5a shadowed with diagonal lines is the entire image for storage. In other words, the electronic camera according to the second embodiment is able to detect a foreign material with sureness even the one imaged in the corner of the image pickup area, which means higher detection accuracy.

Moreover, the electronic camera of the second embodiment additionally has motion blur correction function. Even at the time of obtaining the image for storage (Step S5) the motion blur correction function works during the motion blur correction mode. The motion blur correction lens 21 is not always positioned at a criterion position at obtaining the image for storage (Step S5). (The criterion position refers to a position at which the optical axis of the motion blur correction lens 21 coincides with the optical axes of the other lenses 20a, 20b.) Needless to say that the transferable range of the motion blur correction lens 21 is predetermined depending on the size of the case of the changeable lens unit 20 and so on.

In a case where motion blur amount is extremely large at obtaining the image for storage (Step S5), the motion blur correction lens 21 comes at the upper limit position in the transferable area, which may have the transfer of the image forming position at Step S6 unfeasible. To avoid this situation from happening, the electronic camera of the second embodiment should be preferably configured as follows.

While the motion blur correction mode and foreign material detection mode are set at the same time (Step S1 YES side and Step S3 YES side), the main control part 42 gives an instruction to the optical system control part 27 to limit, during motion blur correction, movement of the motion blur correction lens 21 within a predetermined range that is smaller than the transferable range (Step S21). Upon receiving the instruction the optical system control part 27 controls the motion blur correction lens 21 to move within the predetermined transfer range irrespective of calculated transfer amount for motion blur correction if the calculated transfer amount is beyond the predetermined transfer range. This achieves high foreign material detection accuracy although it degrades the effect of motion blur correction in case of large motion blur amount.

[Additional Description of First and Second Embodiment]

In a conventional electronic camera, foreign materials have been prevented from occurring by improving manufacture techniques for optical devices as its components. On the contrary the electronic cameras of the first and second embodiment can detect foreign materials by themselves so that they are able to get good images (or information for obtaining good images) without adapting the improved manufacture techniques.

For another conventional electronic camera, formed foreign materials are detected by pre-shipping inspection. However, the electronic cameras of the above embodiments are capable of self-detection of foreign materials so that they can obtain good images (or information for obtaining good images) even without the pre-shipping inspection. That is, these embodiments make it possible to decrease the manufacture cost of the electronic camera with its performance maintained.

Moreover, in the above embodiments the transfer amount of the image forming position is set to a predetermined value at Steps S6, S6', however, the transfer amount of the motion blur correction lens 21 may be set to a predetermined value. In this case the transfer amount of the image forming position is obtained from the transfer amount of the motion blur correction lens 21 at Steps S8, S8' in replace of the transfer amount of the motion blur correction 21 obtained from the transfer amount of the image forming position at Step S6, S6'. The foreign material detection accuracy may also be enhanced by adapting known image identifying techniques for the processing at Steps S8, S8'. Incidentally, the known image identifying techniques include a technique for identifying objects in a picture from presence or absence of periodicity of images. This is a so-called self-correlation function using technique which is generally used for analyzing random phenomenon with no periodicity or reproducibility.

In addition, the electronic camera of the above embodiments have a motion blur correction function, however, it is possible to detect foreign materials without the motion blur correction function if it has means for transferring an image forming position. For the means for transferring an image, a mechanism for shifting the optical axis of laser beam incident onto the image sensor or a mechanism for transferring the image sensor 11 are applicable other than the mechanism for transferring the motion blur correction lens 21 of the above embodiments. With the latter mechanism, however, only foreign materials attached to the image sensor are detectable.

Third Embodiment

Figure 7:
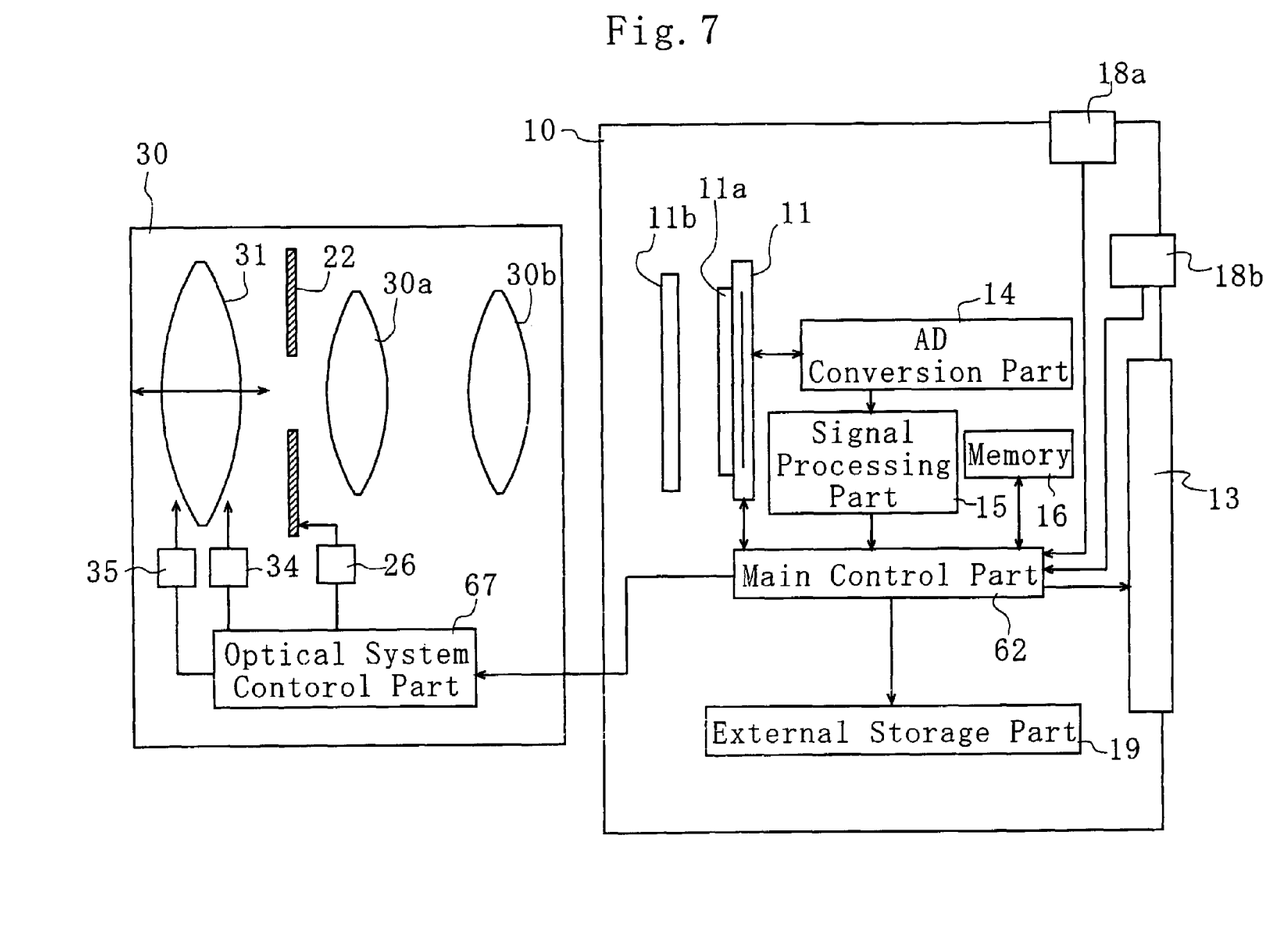
FIG. 7 shows a structure of an electronic camera according to a third embodiment.

Next, a third embodiment of the invention will be explained with reference to FIGS. 7, 8. However, described will be only on the differences between the first and third embodiments. FIG. 7 shows a structure of an electronic camera of the third embodiment. The components same as those in FIG. 1 will be given the same numerals.

The electronic camera of the third embodiment includes lenses 30a, 30b, a focus adjustment lens 31, an aperture diaphragm 22, a positioning sensor 34, an optical system driving mechanism 35, and a diaphragm driving mechanism 26, and an optical system control part 67 in a changeable lens unit 30.

When the focus adjustment lens 31 moves in an optical axis direction (indicated by arrow in the drawing), the image forming position of changeable lens unit 30 moves in the optical axis direction accordingly. The positioning sensor 34 senses the positioning of the focus adjustment lens 31, the optical system driving mechanism 35 transfers the focus adjustment lens 31 in an optical axis direction (indicated by arrow in the drawing), the optical system control part 67 drives and controls each part of the changeable lens unit 30. The user can set/release the foreign material detection mode to/from the electronic camera of the third embodiment which has the changeable lens unit 30 as in the electronic camera of the first embodiment (see FIG. 2).

During the foreign material detection mode, the electronic camera of this embodiment operates as follows.

Upon the release button 18a's being pressed halfway, the main control part 62 instructs the optical system control part 67 to transfer the focus adjustment lens 31 to a focus position where focus is achieved (i.e., the image forming position is on the image pickup plane of the image sensor 11). A transfer amount of the focus adjustment lens 31 necessary for the lens to be in a focused state is calculated by the main control part 62 and/or the optical system control part 67 according to a defocus amount measured by a focus-measuring device (not shown in the drawing) in the camera body 10.

The optical system control part 67, referring to an output from the positioning sensor 34, instructs the optical system driving mechanism 35 to transfer the focus adjustment lens 31 by the calculated transfer amount. Thus, with the focus adjustment lens 31 come into the focused state, the subject image 4a formed on the image pickup plane of the image sensor 11 has a high contrast without a blur.

Thereafter, in response to the release button 18a's fully pressed, shooting is made to acquire an image for storage. Upon the image for storage obtained, the main control part 62 immediately gives an instruction to the optical system control part 67 to move the focus adjustment lens 31 from the focus position. The optical system control part 67, referring to an output of the positioning sensor 34, provides an instruction to the optical system driving mechanism 35 to move the focus adjustment lens 31. As shown in FIG. 8 (2), when the focus adjustment lens 31 is out of focus, the subject image 4a formed on the image pickup plane of the image sensor 11 blurs. In other words, the contrast thereof lowers. Recognizing the blurred subject image 4a, the main control part 62 immediately shoots for getting an image for comparison. Note that for acquiring these images for storage and for comparison, the main control part 62 may instructs the optical system control part 67 to set the diameter of the aperture diaphragm 22 to a minimum number.

Then, the main control part 62 compares data of the image for storage and data of the image for comparison to calculate correction data in conformity with presence/absence of foreign material and the foreign material.

Figure 8:
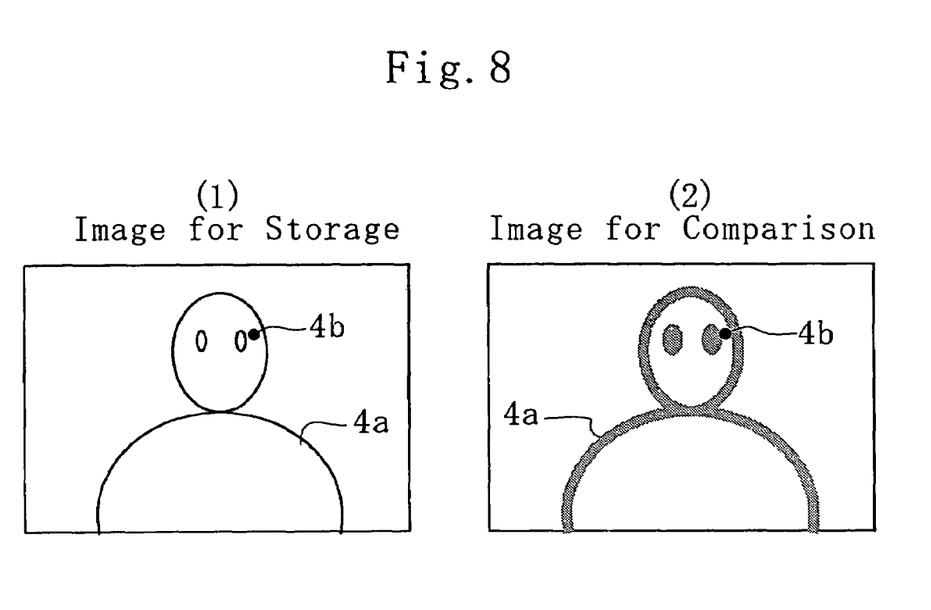
FIG. 8 explains a method of detecting foreign materials according to the third embodiment.

As shown in FIG. 8 (1), (2), the subject image 4a of the image for comparison is more blurred and contrast-varying than that of the image for storage; however, in comparing the image of the foreign material 4b between the two images, the degree of blur as well as the contrast are equal to each other. Here, the main control part 62 compares the contrast of the image for storage and the image for comparison, finds areas with no contrast change occurring, and concludes that the areas have the image of a foreign material. Thereafter, correction data determining processing and image storing processing are performed as the processings of the first embodiment are done in FIG. 3 Steps S8-S11.

In the third embodiment, although the way of changing the state of image formation is different from that in the first embodiment (in the third embodiment the image forming position is changed on the optical axis, in the first embodiment it is changed on the image pickup plane), it is able to detect both of the moving foreign material and unmoving foreign material as in the first embodiment.

Fourth Embodiment

Figure 9:
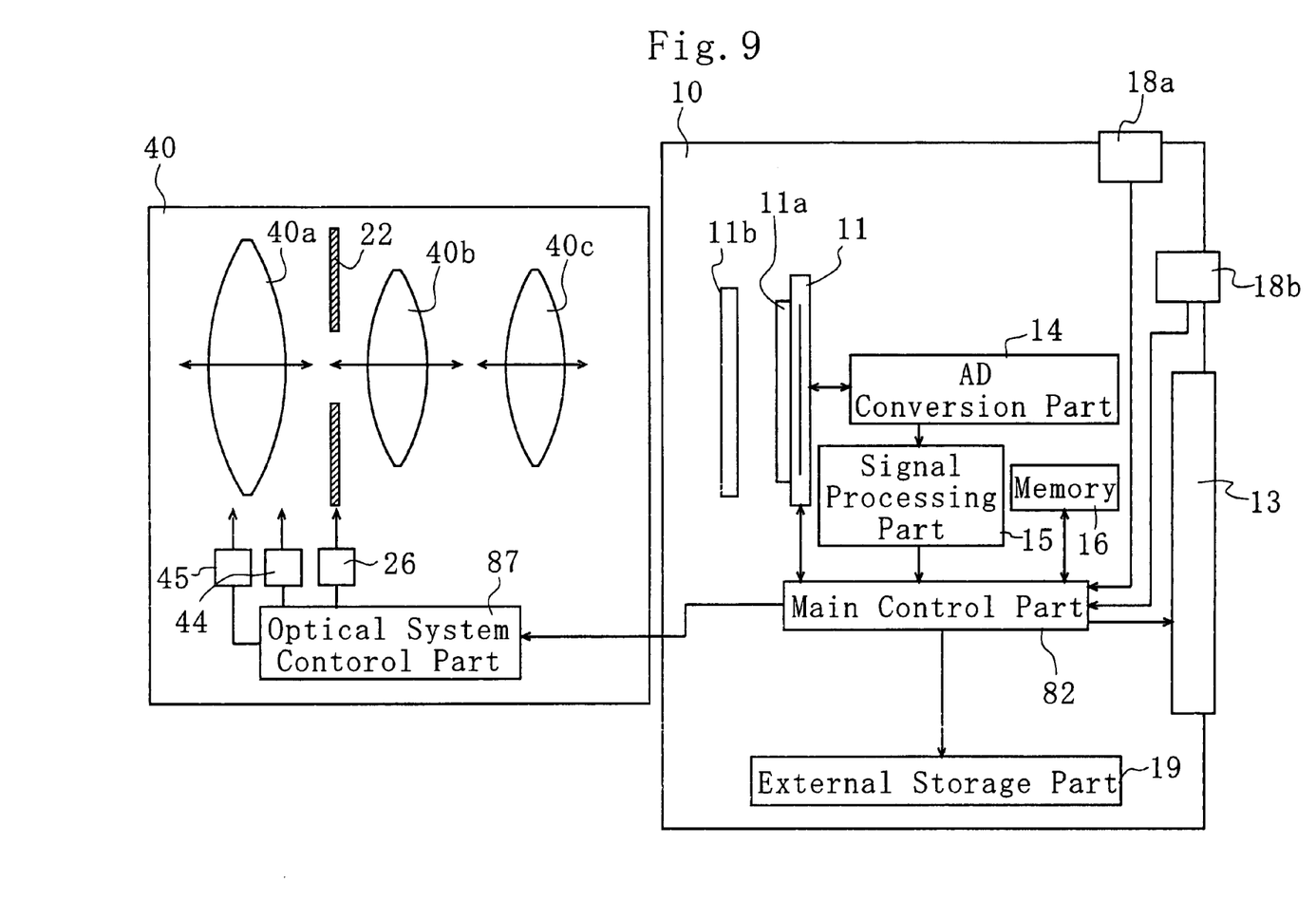
FIG. 9 shows a structure of an electronic camera according to a fourth embodiment.
Figure 10:
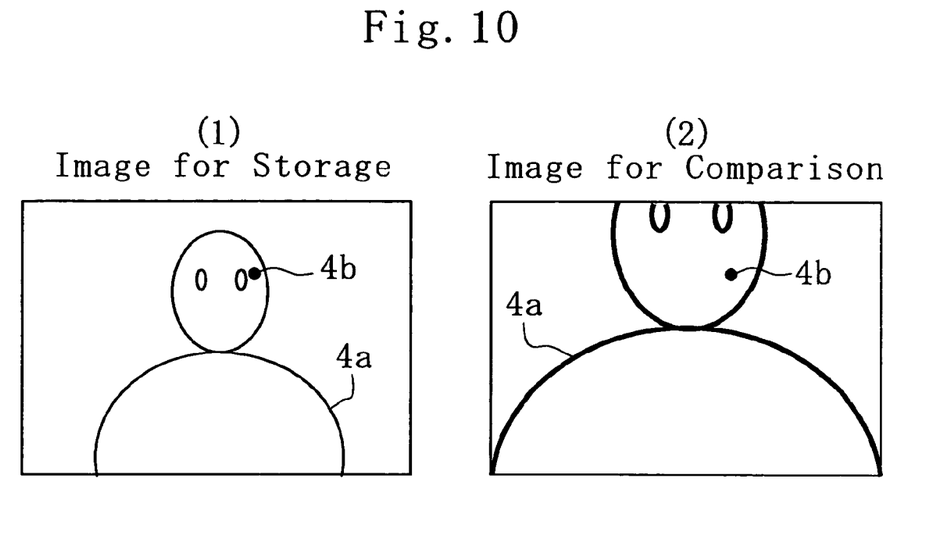
FIG. 10 explains a method of detecting foreign materials according to the fourth embodiment.

Next, a fourth embodiment of the invention will be described with reference to FIGS. 9, 10. However, described will be only on differences between the first and fourth embodiments. FIG. 9 shows a structure of the electronic camera according to the fourth embodiment. Same Components as those in FIG. 1 will be given the same numerals.

The electronic camera includes lenses 40a, 40b, 40c, an aperture diaphragm 22, positioning sensor 44, an optical system driving mechanism 45, and an optical system control part 87 in a changeable lens unit 40.

Movement of the lenses 40a, 40b, 40c to their respective optical axis direction changes image size of the changeable lens unit 40. The positioning sensor 44 senses positions of lenses 40a, 40b, 40c (zoom position), the optical system driving mechanism 45 transfers the lenses to an optical axis direction (indicated by arrow in the drawing), and the optical system control part 87 drives and controls each part of the changeable lens unit 40. Users can set/release the foreign material detection mode to/from the electronic camera of the third embodiment which has the changeable lens unit 40 as in the electronic camera of the first embodiment (see FIG. 2).

During the foreign material detection mode, the electronic camera of this embodiment operates as follows.

Upon the release button 18a's being fully pressed, shooting is made to obtain an image for storage. Recognizing the obtained image for storage, the main control part 82 immediately instructs the optical system control part 87 to transfer the zoom position of the changeable lens unit 40. The optical system control part 87 referring to an output of the positioning sensor 44 gives an instruction to the optical system driving mechanism 45 to transfer the lenses 40a, 40b, 40c.

The changes in the zoom positions lead to changing the size of the subject image 4a formed on the image pickup plane of the image sensor 11, and to changing distance from each position of the subject image 4a to the center. Recognizing the changes in the size of the subject image 4a have occurred, the main control part 82 immediately performs shooting to obtain an image for comparison. For obtaining the image for storage and image for comparison, the main control part 82 may give an instruction to the optical system control part 87 to set the diagram of the aperture diaphragm 22 to a minimum number.

The main control part 82 then compares data of the image for storage and data of the image for comparison to calculate correction data in accordance with presence/absence of foreign material and the foreign material. As shown in FIG. 10 (1), (2), the subject image 4a in the image for storage and that in the image for comparison have different sizes (distance from each position of the subject 4a to the center) from each other, however, with regard to the images of the foreign material 4b in the image for storage and the image for comparison, they have the same size (distance from each position of the image 4b to the center). Accordingly, the main control part 82 compares the image for storage and image for comparison, find areas (patterns) with no size changes occurring and concludes that the areas have the image of the foreign material. Thereafter, correction data determining processing and image storing processing are performed as the processings of the first embodiment are done in FIG. 3 Steps S8-S11.

In the fourth embodiment, although the way of changing the state of image formation is different from that in the first embodiment (in the fourth embodiment the image size is changed, in the first embodiment the image forming position is changed on the image pickup plane), it is able to detect both of the moving foreign materials and unmoving foreign materials as in the first embodiment.

[Additional Description of the Third and Fourth Embodiments]

The number of obtained images for comparison is "1" in the electronic cameras of the third and fourth embodiments as of the first embodiment, however, the number thereof may be two or more to improve the foreign material detection accuracy as in the second embodiment. The direction in which the two images for comparison shift from the image for storage as a criterion (i.e., difference arises) may be "opposite direction to each other" but may also be "the same direction".

Moreover, the foreign material detection accuracy may be heightened by applying the known image identifying technique to the electronic camera of the third and fourth embodiments.

[Additional Features]

The electronic camera of each of the above embodiments is configured such that correction data is calculated in conformity with the type of foreign material (size, position, and concentration of the image of foreign material); however, it may be configured to detect only the presence/absence of a foreign material and notify the user of the detection result.

Further, in the electronic cameras of the above embodiments the main control parts 12, 42, 62, 82, which are provided therein, process every operation of the electronic cameras; however, a storage medium wherein a program equivalent to a part or all of the processings of the main control parts 12, 42, 62, 82 is stored may be created and mounted to the electronic camera when necessary. For another alternative, the user of the electronic camera may download the program from a certain home page via the Internet on computer. For instance, the user can download the program by accessing to the certain home page and select from products displayed on the screen the same type of electronic camera of which he or she is in use.

In addition, dial-up connection is applicable as a way of computer-Internet connection as follows.

The user connects his or her computer with a telephone line via a modem or terminal adapter then the computer is now connected via the telephone line with the modem or terminal adapter of a service provider which provides Internet connection service. The modem or terminal adapter of the service provider is connected with a server, and the server is connected with the Internet 24-hours a day through a router which sets relay routes to the Internet. The user makes a phone call when necessary in order to access to the Internet (home page) on the computer via the server of the provider. The connection between the computer and Internet is not limited to the dial-up connection but it may be all-time connection by use of a dedicated line to the service provider.

Further, in a case where any of the above electronic cameras has a known continuous shooting function, it is preferable to limit the operation of the main control part 12, 42, 62, 82 such that the foreign material detection mode is settable only when the storage area of the memory has a sufficient memory margin, because there is a possibility of large data of continuously shot plural images occupying the memory. This achieves effective memory use.

The electronic cameras of the above embodiments are configured such that the user once sets the foreign material detection mode, the detection is automatically performed until it is released (see FIGS. 3, 5). However, they may be configured to perform the detection only when the user thinks it is necessary. Specifically, with the release button 18a's being fully pressed and a predetermine operation button being pressed at the same time, the electronic camera performs the detection, and with the release button 18a being fully pressed but the predetermine operation button being not pressed, the electronic camera does not perform the detection.

Moreover, the electronic cameras of the above embodiments may be configured to detect that moving foreign materials stop moving. For example, the main control parts 12, 42, 62, 82 accumulate correction data acquired at the foreign material detection. When obtaining the same correction data over a predetermined number of times successively, the main control parts 12, 42, 62, 82 determines that the moving foreign material has become unmoving, and notifies the user of the fact. Alternatively, the main control parts 12, 42, 62, 82 notify the user of the type (image size, position, and concentration) of the foreign material which is indicated from the continuously obtained correction data.

Finally, the above embodiments describes on the lens changeable electronic camera but the invention is also applicable to a lens-integral type electronic camera.

The invention is not limited to the above embodiments and various modifications may be made without departing from the spirit and scope of the invention. Any improvement may be made in part or all of the components.

What is claimed is:

1. An electronic camera comprising:
   an image sensor having an image pickup plane on an image plane of a shooting optical system;
   a formation changing section transferring, on the image pickup plane, an image forming position of the shooting optical system by driving a motion blur correction lens that is included in the shooting optical system in a direction perpendicular to an optical axis of the shooting optical system; and
   a control section driving and controlling the image sensor and the formation changing section, wherein:
   the electronic camera is settable to a blur correction mode by the control section, the blur correction mode being a mode in which the motion blur correction lens is driven in response to vibration,
   the electronic camera is settable to a foreign material detection mode by the control section, the foreign material detection mode being a mode in which the formation changing section is driven to set a plurality of states of image forming positions differing from each other on the image pickup plane, the image sensor is driven to obtain a plurality of images in each of the states,
   the plurality of images are compared to find a part of the image which has not varied in accordance with a change in the state of image forming position, and the found part is determined as an image of a foreign material, and
   the control section differentiates operation of the motion blur correction lens as the formation changing section between when the electronic camera is set to both the motion blur correction mode and the foreign material detection mode, and when the electronic camera is set only to the motion blur correction mode.

2. The electronic camera according to claim 1, wherein the number of the plurality of images is two.

3. The electronic camera according to claim 1, wherein the number of the plurality of images is three or more.

4. The electronic camera according to claim 3, wherein the plurality of images includes at least an image as a criterion of the comparison and two images which are shifted from the image as a criterion in a same direction.

5. The electronic camera according to claim 3, wherein the plurality of images includes at least an image as a criterion of the comparison and two images which are shifted from the image as a criterion in opposite directions to each other.

6. The electronic camera according to claim 1, wherein a diameter of an aperture diaphragm of the shooting optical system is scalable; and
   the control section sets the diameter of the aperture diaphragm to a minimum value when obtaining the plurality of images.

7. The electronic camera according to claim 1, wherein the control section performs a series of operations immediately after performing a normal shooting to detect an image of a foreign material by comparing an obtained image by the normal shooting with obtained images by the series of operations, the normal shooting being driving the image sensor according to an instruction from exterior, the series of operations being from the driving of the formation changing section to set the plurality of states to the driving of the image sensor to obtain the plurality of images.

8. The electronic camera according to claim 7, wherein while the electronic camera is set to both the blur correction mode and foreign material detection mode, the control section sets a size of an area in which the image forming position is transferred during motion blur correction, to a smaller value than while the electronic camera is set only to the blur correction mode.

9. The electronic camera according to claim 7, wherein:
   the shooting optical system has a mechanism for moving the image forming position to an optical axis direction; and
   the formation changing section changes a state of image formation of the shooting optical system by driving the moving mechanism.

10. The electronic camera according to claim 7, wherein the shooting optical system has a mechanism for changing an image size; and
    the formation changing section changes the state of image formation of the shooting optical system by driving the size changing mechanism.

11. A computer-readable storage medium that stores a control program for controlling an electronic camera comprising: an image sensor having an image pickup plane on an image plane of a shooting optical system; a formation changing section changing a state of image formation of the shooting optical system on the image pickup plane; and a control section driving and controlling the image sensor and the formation changing section, the program comprising instructions that cause the electronic camera to perform the steps of:
    setting the electronic camera to a blur correction mode, the blur correction mode being a mode in which a motion blur correction lens included in the shooting optical system is driven in response to vibration in a direction perpendicular to an optical axis of the shooting optical system;
    setting the electronic camera to a foreign material detection mode, the foreign material detection mode being a mode in which the motion blur correction lens as formation changing section is driven in said direction to set a plurality of states of image forming positions differing from each other on the image pickup plane, the image sensor is driven to obtain a plurality of images in each of the states;
    comparing the plurality of images to find a part of the image which has not varied in accordance with a change in the state of image forming position and determining the found part as an image of a foreign material; and
    differentiating operation of the motion blur correction lens as the formation changing section between when the electronic camera is set to both the motion blur correction mode and the foreign material detection mode and when the electronic camera is set only to the motion blur correction mode.

* * * * *

UNITED STATES PATENT AND TRADEMARK OFFICE
CERTIFICATE OF CORRECTION

PATENT NO.         : 7,580,071 B2                                        Page 1 of 1
APPLICATION NO.    : 10/639742
DATED              : August 25, 2009
INVENTOR(S)        : Takayuki Uchiyama It is certified that error appears in the above-identified patent and that said Letters Patent is hereby corrected as shown below:

Title Page
Please delete the following:

"(30)    Foreign Application Priority Data

Aug. 30, 2002   (JP) ............................ 2002-253709
  Jul. 2, 2003    (JP) ............................ 2003-190380"

and replace with:

--(30)   Foreign Application Priority Data

Aug. 30, 2002   (JP) ............................ 2002-253709
  Jul. 2, 2003    (JP) ............................ 2003-190380
  Jul. 25, 2003   (JP) ............................ 2003-201807--

Signed and Sealed this

Third Day of November, 2009

David J. Kappos
*Director of the United States Patent and Trademark Office*